United States Patent [19]
Hestehave et al.

[11] Patent Number: 4,994,223
[45] Date of Patent: Feb. 19, 1991

[54] EXTRUDER SCREW AND METHOD FOR THE EXTRUSION OF THERMALLY SENSITIVE THERMOPLASTIC MATERIALS

[75] Inventors: Borge Hestehave, Alta Loma; Kjeld Hestehave, Upland, both of Calif.

[73] Assignee: Bomatic, Inc., Ontario, Calif.

[21] Appl. No.: 367,031

[22] Filed: Jun. 16, 1989

[51] Int. Cl.$^5$ .................. B29C 47/00; B29C 47/60; B29C 47/64
[52] U.S. Cl. ...................... 264/211.21; 264/349; 366/81; 366/89; 366/90; 366/319; 366/323; 366/324; 425/207; 425/208; 425/209
[58] Field of Search ........... 264/176.1, 211.21, 211.23, 264/349; 425/207, 208, 209; 366/81, 82, 89, 90, 318, 319, 322, 323, 324

[56] References Cited

U.S. PATENT DOCUMENTS

| | | | |
|---|---|---|---|
| 3,676,034 | 7/1972 | Wendricks | 425/208 X |
| 3,762,693 | 10/1973 | DeBoo et al. | 366/81 |
| 3,767,754 | 10/1973 | Manning et al. | 264/211.23 |
| 4,243,629 | 1/1981 | Tramezzani | 264/349 X |
| 4,280,802 | 7/1981 | Lang et al. | 425/208 |
| 4,321,229 | 3/1982 | Blakeslee, III et al. | 264/349 |
| 4,367,190 | 1/1983 | Beach | 264/349 X |
| 4,867,927 | 9/1989 | Funaki et al. | 264/349 X |

FOREIGN PATENT DOCUMENTS 133979 3/1985 European Pat. Off. ............ 425/208

Primary Examiner—Jeffery Thurlow
Assistant Examiner—Leo B. Tentoni
Attorney, Agent, or Firm—Sixbey, Friedman, Leeson & Ferguson

[57] ABSTRACT

An extruder screw and a method for extrusion to achieve high output rates with thermally sensitive plastic materials and without thermal degradation problems involving the use of a single flight metering type extruder screw having an initial feed zone, distal metering zone, and a transition zone interconnecting the feed and metering zones. In particular, improvements in the extrusion of thermally sensitive plastics such as PVC are achieved through use of a compression ratio of approximately 2:1, a constant lead and pitch, and a proportioning of the length of the feed zone, transition zone, and metering zone relative to the total length of the zones of 27-33%, 23-25%, and 45-48%, respectively. To achieve cooler and more uniform mixing with rigid PVC, polyethylene and like materials, an improved arrangement for using rings of mixing pins is provided.

14 Claims, 1 Drawing Sheet

EXTRUDER SCREW AND METHOD FOR THE EXTRUSION OF THERMALLY SENSITIVE THERMOPLASTIC MATERIALS

BACKGROUND OF THE INVENTION

1. Field of the Invention

The present invention relates to an extruder screw of the metering screw type whereby material is advanced through only a feed zone, conic transition zone, and metering zone. Particularly, the present invention is directed to the extrusion of thermally sensitive plastic materials, and rigid plastic materials in a manner obtaining lower temperatures at higher output rates.

2. Description of Related Art

As is known, for example from U.S. Pat. No. 4,243,629, polyvinyl chloride (PVC) is very sensitive thermally above 100° C. (212° F.), making extrusion possible only by adding of stabilizers and plasticizers, which may negatively influence the quality of the product Furthermore, despite the use of stabilizers and plasticizers, local overheatings can occur.

Overheating that produces thermal decomposition of the PVC results in separation of hydrochloric acid as well as discolorization and ultimately carbonization. Still further, the damaged mass can become attached to the surface of the metal of the extruder. The net result is that the extruder must be shut down and disassembled. Even if the screw has not become damaged, all parts of it and the extruder must be carefully cleaned. After cleaning and/or repair, the extruder must then be reassembled and the overall process results in a considerable loss of time and production capacity, as well as the direct and indirect costs associated therewith. In order to avoid these problems, U.S. Pat. No. 4,243,629 discloses a complicated extruder screw construction which creates seven different zones and utilizes brake flow rings with orifices therethrough.

Another problem associated with the extrusion of thermoplastic materials, such as polyethylene and PVC, is obtaining a high degree of thermal uniformity and mixing. Illustrated and described in U.S. Pat. No. 3,762,693 as prior art is a "slotted ring" which is formed on an extruder screw by a circular array of 36 mixing pins projecting radially from the root diameter of the screw about the entire circumference thereof. In such an arrangement, the height of the pins is less than the depth of the flight, and the flight is interrupted to permit the ring of pins to be continuous. However, this design is described as being subject to various disadvantages due to the presence of the broken flight, especially when using PVC as the extrudate.

Thus, for purposes of overcoming the deficiencies of the described prior art design, U.S. Pat. No. 3,762,693 proposes a screw design for a screw of the compression relief type (having successive feed, compression, relief, and metering zones), wherein the helical flight is uninterrupted and the array of mixing pins is interrupted, instead, at the point at which the flight intersects the now only substantially annular array of 32 pins that are uniformly spaced through approximately 310° of arc. Four such arrays of pins are used in the metering zone of the disclosed compression relief screw, one in proximity to each end of the metering zone, and two additional arrays uniformly spaced therebetween; although it is indicated that the number of pins, their location, diameter and spacing may vary according to a particular application of the extruder, the melt temperature, type of plastic shape extruded, type of materials, diameter of the screw, etc.

This continuous flight, interrupted array of mixing pins concept has been put into commercial use by others as well. For example, such have been utilized in the metering zone on 80 mm diameter metering screws produced by the Battenfeld-Fischer Blasformtechnik GmbH of Germany, and the 90 mm extrusion screws of the Germany company, Beckum Machinenfabriken GmbH. For example, a 90 mm screw produced by Beckum utilizes 24 pins at a 10° diameter-to-diameter spacing.

Another approach which has been taken to obtaining a more intense mixing effect is described for the compression relief type of extruder screw shown in U.S. Pat. No. 4,367,190, wherein a mixing means is formed of three or four spaced-apart mixing elements, each of which comprises two or three closely spaced rings of pins. The pins of each row are in a staggered relationship with respect to those of the adjacent ring, in order to provide a tortuous path for polymer passing the mixing means.

However, it should be recognized that numerous different types of extruder screws exist in addition to the metering screw and compression relief types of screws described. Furthermore, it should be appreciated that the feature of any screw, such as the lengths of the various zones, screw flight depths, compression ratio, etc. cannot be viewed in isolation because each aspect has an effect on every other, thereby producing very different results in various combinations with each other, as well as with different materials or on different types and sizes of screws. Thus, despite the above-noted points, to the inventors' knowledge, up to this point, an extruder of the single flight metering type having an initial feed zone in which the screw flight has a constant depth, a distal metering zone in which the screw flight has a constant depth that is less than that of the feed zone, and a transition (compression) zone interconnecting the feed zone with the metering zone, and in which the depth of the screw flight progressively decreases from that in the feed zone to that in the metering zone, has not been achieved which will be truly effective for the extrusion of temperature sensitive thermoplastic materials, particularly for screws having an L/D ratio of the total length of said zones to the outer diameter of the screw in a range of 20-30:1, and particularly for use with rigid PVC or polyethylene.

SUMMARY OF THE INVENTION

In keeping with the foregoing, it is a primary object of the present invention to provide an extruder screw and method for extrusion which will enable temperature sensitive thermoplastic materials to be extruded at high rates without producing adverse thermal effects, such as burning.

It is another object of the present invention to achieve the foregoing object while also producing a more thorough mixing of thermoplastic materials such as rigid PVC and polyethylene.

It is a more specific object of the present invention to produce a single flight metering type extruder screw wherein the respective lengths of the feed, transition, and metering zones are balanced in conjunction with the compression ratio so as to increase output while eliminating the problem of extrudate burning within the transition zone, which such screws for currently available extruders have experienced.

Still another object of the present invention is to provide an extruder screw having a pin arrangement in its metering zone which will ensure thorough mixing of rigid temperature sensitive materials without impeding output.

These and other objects are achieved in an extruder of the single flight metering type having an initial feed zone in which the screw flight has a constant depth, a distal metering zone in which the screw flight has a constant depth that is less than the depth of the flight in the feed zone, and a transition zone that interconnects the feed zone with the metering zone and in which the depth of the screw flight progressively decreases from that in the feed zone to that in the metering zone. In particular, for a screw to have a length to diameter ratio in a range of 20-30:1 and a compression ratio (represented by the difference between the feed zone and metering zone flight depths) of 2:1, the length of the feed zone is set at 27-33% of the total length of the feed, transition and metering zones, with the length of the transition and metering zones, respectively being 23-25% and 45-48% of this total length, and the lead and pitch of the flight being constant throughout the length of the screw flight.

These and further objects, features and advantages of the present invention will become more obvious from the following description when taken in connection with the accompanying drawings which show for purposes of illustration only, several embodiments in accordance with the present invention.

DETAILED DESCRIPTION OF THE PREFERRED EMBODIMENTS

Figure 2:
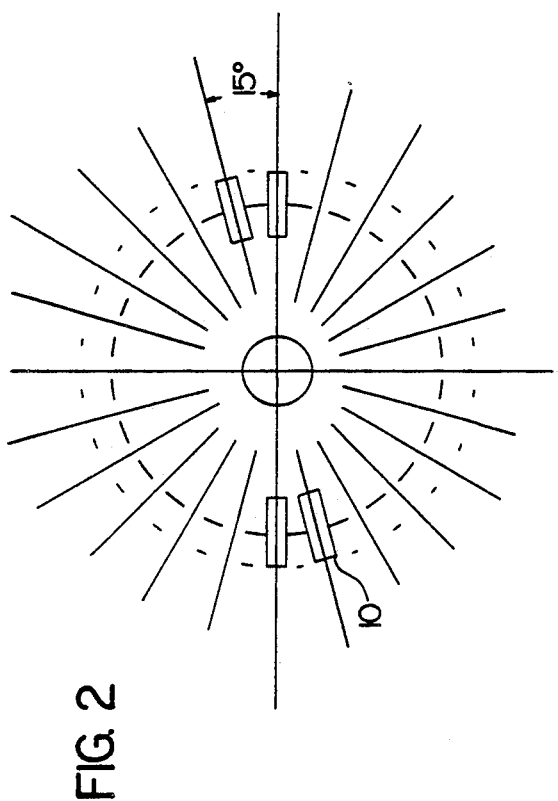
FIG. 2 is a schematic cross-sectional view depicting a metering zone pin row of the FIG. 1 screw.
Figure 1:
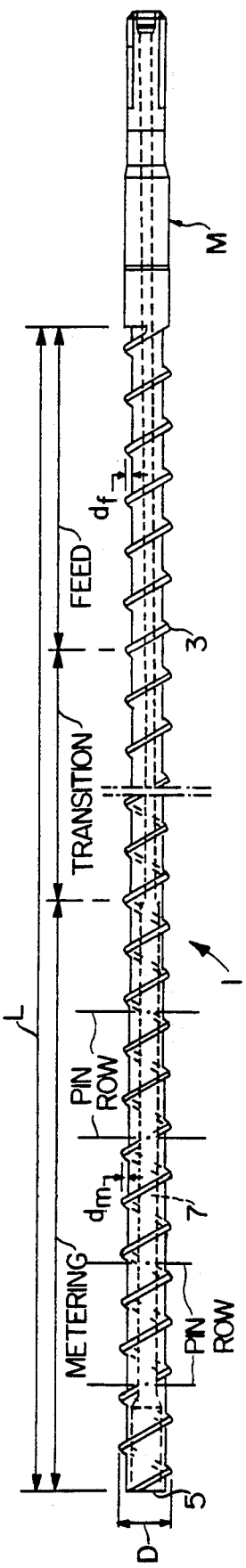
FIG. 1 is an elevational view of an extruder screw in accordance with a preferred embodiment of the present invention.

The illustrated extruder screw 1 is designed for use in extruders of the type found in existing commercially available injection and blow-molding machines such as the models 121, 151 and BA series machines produced by Beckum Machinenfabriken GmbH and the models 104, 106 and VK series machines produced by Battenfeld-Fischer Blasformtechnik GmbH which utilize 80 and 90 mm diameter extruder screws. However, the extruder screw in accordance with the present invention will find applicability to extruders of various other types that utilize screws having a total length L to flight outer diameter D ratio in the range of 20-30:1, and of a diameter range of 50-130 mm (about 2-5 inches). Furthermore, as is typical of a conventional single flight metering type extruder screw, the screw 1 has a flight 3 which extends from a mounting portion M (by which the screw is engaged with the drive motor of the extruder) to a distal end 5 at which a tip element of one of the various conventional designs is mounted, and an internal cooling passage 7 through which cooling air is circulated along the length of the screw 1. Additionally, as characteristic of a metering screw, the initial portion of the flight 3 is a feed zone in which the screw flight has a constant depth $d_f$; a distal metering zone in which the screw flight has a constant depth $d_m$ that is less than that of the depth $d_f$ of the feed zone, and a transition zone that interconnects the feed and metering zones, and in which the depth of the flight progressively decreases from the depth $d_f$ o the feed zone to the depth $d_m$ of the metering zone. The relationship between the depth of the flight 3 of the feed and metering zones is conventionally termed the "compression ratio".

The following table compares characteristics of five different screws, those designated A and B being constructed in accordance with the present invention, and those designated C, D and E being extruder screws obtained commercially.

| Screw: | A | B | C | D | E |
|---|---|---|---|---|---|
| D | 90 mm | 80 mm | 90 mm | 80 mm | 80 mm |
| $d_f$ | 15 | 14 | 14.75 | 10.3 | 14.6 |
| $L_f/D$ | 7.4 | 7.4 | 6.0 | 4.6 | 4.9 |
| $L_t/D$ | 6.0 | 6.0 | 8.3 | 10.0 | 4.9 |
| $L_m/D$ | 11.9 | 11.2 | 11.0 | 10.0 | 14.8 |
| L/D | 25.3 | 24.6 | 25.3 | 24.6 | 24.6 |
| $d_f$:dm | 2.0 | 2.0 | 1.4 | 2.0 | 2.56 |

All had a constant lead and pitch equal to D

All of the above screws were internally air cooled and run at 45 rpm with rigid PVC as the extrudate. During the course of the runs with the commercial screws C, D and E, temperatures as high as 380-390° F. were measured with output being approximately 220 pounds per hour with the 80 mm screws and 290 pounds per hour with the 90 mm screw. In each case, production had to be interrupted due to burning of the PVC (which occurs at about 370° F.). On the other hand, with screws A and B, temperatures measured along the screw did not exceed approximately 310° F., and with output at 45 rpm being approximately 500 pounds per hour with 90 mm screw A and 340 pounds per hour with 80 mm screw B. Furthermore, the burning of the PVC which occurred in the transition zones of the commercial screws did not occur so that the runs were able to be completed without interruption with both screws A and B.

As noted in the "Background" portion, no individual characteristic of an extruder screw can be viewed in isolation as each plays a role in the net effect in an interrelated, not independent, manner. This fact is reflected in the above table which reveals the following. Firstly, the present applicants have found that a screw depth of $d_f$ for the flight 3 should be essentially 15 mm on a 90 mm screw, and 14 mm on an 80 mm screw, with a compression ratio $d_f$:$d_m$, between the depths of the flight 3 in the feed and metering zones, of 2.0. However, in and of themselves, such characteristics are not sufficient as reflected by the fact that screw C achieved unsatisfactory results despite using a lower compression ratio and screws D and E obtained unsatisfactory results despite using the same and greater compression ratios. This is particularly clear when viewed with the fact that depth $d_f$ of screw D was less than that of applicants corresponding screw B and screw E was greater, while screw C had a depth $d_f$ within 0.25 mm of that of applicants' screw A. In this regard, it is also relevant to note that the ratio of the screw length L to the flight diameter D was identical for screws A and C and for screws B, D and E, respectively. Similarly, the table reflects the fact that the individual zones can be made larger or smaller without assuring a successful result.

In view of the foregoing, it has been concluded that to successfully extrude thermally sensitive plastics, such as PVC, without experiencing burning problems, a single flight metering type screw which has a lead and pitch that is constant throughout the length of the screw flight and an L/D ratio in the range of 20-30:1 should maintain a compression ratio $d_f : d_m$ of approximately 2:1 with the length of the feed zone being from 27-33% of the total length L, the length of the transition zone being from 23-25% of the total length L, and the length of the metering zone being 45-48% of the total length L. More particularly, preferably, the L/D ratio should be between 24-26:1 and the outer diameter between 2-4 inches. Furthermore, outstanding results have been found in the case of the screws A and B wherein the constant pitch was "square" (i.e., wherein the lead between adjacent turns of the flight equalled the diameter D) and with the flight comprising approximately 7-8 turns in the feed zone, 6 turns in the transition zone, and approximately 11-12 turns in the metering zone.

With a screw of the inventive type, the thermally sensitive plastic material, such as polyvinyl chloride and like materials, will be compacted and worked in the feed zone, wherein the depth $d_f$ of the material channel between the screw root and the inner cylindrical surface of the barrel of the extruder is large, for a relatively long time, before being subjected to compression and politicization in the transition zone which is of relatively short length. After leaving the transition zone, the material is mixed and pumped in the metering zone, after which the thoroughly and uniformly mixed and plasticized material is fed from the extruder via an extrusion die or injection nozzle in a conventional manner.

A screw 1, as described so far, is ideal for soft flexible vinyl and other materials with which screws having no mixing pins should be used. However, for materials such as rigid PVC and polyethylene, a plurality of rows of mixing pins 10 should be provided However, despite the teachings of the prior art described above, at least with rigid PVC, polyethylene and like materials, and with a screw of the type described above with respect to the present invention, it has been found that better, i.e., more uniform, mixing at cooler temperatures can be achieved by utilizing single rows of mixing pins at each of three or four locations that are disposed within the metering zone at increments that are widely spaced from each other and from upstream and downstream ends of the metering zone, and with each pin row being comprised of a single ring of radially oriented mixing pins which project a distance from the root diameter of the screw that is substantially equal to the depth $d_m$ of flight 3 and are positioned at uniform angular increments about the full circumference of the screw, the flight being interrupted at the point of its intersection with each pin row.

Additionally, in accordance with a preferred embodiment, the increments at which the pin row locations are spaced along the metering zone are nonuniform; particularly, viewed in a direction from the upstream end of the metering zone toward the downstream end of the metering zone, the first increment, from the upstream end to the first ring of mixing pins, is approximately 10-15% greater than the increment from the last ring of mixing pins to the downstream end 5 of the screw 1. Also, while the increments between the second and third, and third and fourth rings may be equal (if four pin rows are utilized instead of three), the increment between the first ring and the second ring of mixing pins 10 is approximately 5% greater than that of the first increment between the upstream end of the metering zone and the first ring and of each subsequent increment between the second and last pin rows (i.e., the last pin row being either the third or fourth ring of pins depending upon the number of pin rows utilized).

Still further, in the illustrated preferred embodiment, each pin row is comprised of an uninterrupted ring of only 24 radially oriented mixing pins. That is, a uniform 15° angular spacing exists between the center axis of each pair of adjacent pins, with the pins having a 4-5 mm diameter for an extruder screw having a diameter D of 80-90 mm.

With a metering zone constructed with the inventive arrangement of pin rows, the relatively widely spaced pins of each ring, together with the interrupted flight, ensure that the heating which results from the sheer forces produced by the pins of each ring of pins does not excessively heat temperature sensitive materials, yet, at the same time a homogeneous extrudate is effectively produced. Thus, rigid plastic materials, such as rigid polyvinyl chloride, polyethylene and like materials can be effectively extruded without experiencing thermal degradation problems.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. In an extruder screw, for extrusion of thermoplastic materials, of a single screw flight metering type having an initial, feed zone in which the screw flight has a constant depth $d_f$, a distal metering zone in which the screw flight has a constant depth $d_m$ that is less than that of said feed zone, and a transition zone, interconnecting said feed zone with said metering zone and in which the screw flight progressively decreases in depth from that in said feed zone to that in said metering zone, an L/D ratio of a total length, L, of said zones to an outer diameter, D, of said screw is in the range of 20-30:1, the improvement for extrusion of thermally sensitive plastics comprising the screw having a compression ratio $d_f : d_m$ of approximately 2:1, a length of the feed zone being form 27-33% of the total length L, a length of the transition zone being from 23-35% of said total length L, and a length of said metering zone being 45-48% of said total length L, and the lead and pitch being constant throughout the total length of said zones.

2. An extruder screw according to claim 1, wherein said L/D ratio is between 24-26:1, the outer diameter D is between 2-4 inches.

3. An extruder screw according to claim 2, wherein said flight comprises approximately 7-8 turns in said screw feed zone, 6 turns in said transition zone, and 11-12 turns in said metering zone.

4. An extruder screw according to claim 3, wherein for extrusion of rigid plastics, said screw flight is interrupted in said metering zone at each of 3-4 locations by a single ring of 24 radially oriented mixing pins which project a distance from a root diameter of the screw that is substantially equal to the depth $d_m$, and are positioned at uniform angular increments about a full circumference of the screw; and wherein said 3-4 locations are at widely spaced increments from each other and upstream and downstream ends of said metering zone.

5. An extruder screw according to claim 2, wherein, for extrusion of rigid plastics, said screw flight is interrupted in said metering zone at each of 3–4 locations by a single ring of 24 radially oriented mixing pins which project a distance from the root diameter of the screw that is substantially equal to the depth $d_m$, and are positioned at uniform angular increments about the full circumference of the screw; and wherein said 3–4 locations are at widely spaced increments from each other and upstream and downstream ends of said metering zone.

6. An extruder screw according to claim 1, wherein, for extrusion of rigid plastics, said screw flight is interrupted in said metering zone at each of 3–4 locations by a single ring of 24 radially oriented mixing pins which project a distance from the root diameter of the screw that is substantially equal to the depth $d_m$, and are positioned at uniform angular increments about the full circumference of the screw; and wherein said 3–4 locations widely spaced increments from each other and upstream and downstream ends of said metering zone.

7. In an extruder screw, extrusion of thermoplastic materials, of a single screw flight metering type having an initial, feed zone in which the screw flight has a constant depth $d_f$, a distal metering zone in which the screw flight has a constant depth $d_m$ that is less than that of said feed zone, and a transition zone, interconnecting said feed zone with said metering zone and in which the screw flight progressively decreases in depth from that in said feed zone to that in said metering zone, an L/D ratio of a outer diameter, D, of said screw is in the range of 20–30:1; the improvement for extrusion of rigid and thermally sensitive plastic materials comprising said flight being interrupted in said metering zone at each of 3–4 locations by a single ring of 24 radially oriented mixing pins which project a distance from a root diameter of the screw that is substantially equal to the depth $d_m$, and are positioned at uniform angular increments about a full circumference of the screw; and wherein said 3–4 locations are at widely spaced increments from each other and from upstream and downstream ends of said metering zone.

8. An extruder screw according to claim 7, wherein the widely spaced increments of said locations in the metering zone are nonuniform.

9. An extruder screw according to claim 8, wherein, viewed in a direction from the upstream end of the metering zone toward the downstream end of the metering zone, a first of said increments, from said upstream end to a first ring of mixing pins, is 10–15% greater than a last of said increments, from a last ring of mixing pins to said downstream end, and wherein a second increment, between the first ring and a second ring of mixing pins, is approximately 5% greater than said first increment and of each subsequent increment between the second and last rings of mixing pins.

10. A method for extrusion of a rigid, thermally sensitive plastic material materials, comprising the steps of:
(a) providing a screw extruder with an extruder screw of the single screw flight type having an initial feed zone in which the screw flight has a constant depth $d_f$, a distal metering zone in which the screw flight has a constant depth $d_m$ that is less than that of said feed zone, and a transition zone, interconnecting said feed zone with said metering zone and in which the screw flight progressively decreases in depth from that in said feed zone to that in said metering zone, an L/D ratio of a total length, L, of said zones to an outer diameter, D, of said screw is in a range of 20–30:1;
(b) feeding a rigid thermally sensitive plastic material to said feed zone;
(c) compacting and working said material in said feed zone and delivering it to said transition zone;
(d) plasticizing and compressing said material in the transition zone and passing the material to the metering zone at a compression ratio $d_f:d_m$ of approximately 2:1;
(e) mixing and pumping said material in the metering zone; and
(f) extruding said material from the extruder;
wherein the compacting and working of the material is performed in said feed zone along 27–33% of the total length L; wherein the plasticizing and compressing of the material is performed in said transition zone along 23–35% of said total length L; wherein said mixing and pumping in the metering zone is performed along 45–48% of the total length L; and wherein the material is fed along the screw by the flight at a constant lead and pitch.

11. A method for extrusion of rigid, thermally sensitive plastic materials, comprising the steps of:
(a) providing a screw extruder with an extruder screw of the single screw flight type having an initial feed zone in which the screw flight has a constant depth $d_f$, a distal metering zone in which the screw flight has a constant depth $d_m$ that is less than that of said feed zone, and a transition zone, interconnecting said feed zone with said metering zone and in which the screw flight progressively decreases in depth from that in said feed zone to that in said metering zone, and has an L/D ratio of a total length, L, of said zones to a total length, L, of said zones to an outer diameter, D, of said screw in a range of 20–30:1;
(b) feeding a rigid thermally sensitive plastic material to said feed zone:
(c) compacting and working said material in said feed zone and delivering it to said transition zone;
(d) plasticizing and compressing said material in the transition zone and passing the material to the metering zone;
(e) mixing and pumping said material in the metering zone; and
(f) extruding said material from the extruder;
wherein mixing of the material in the metering zone is assisted by a single ring of 24 radially oriented mixing pins which project a distance from a root diameter of the screw that is substantially equal to the depth $d_m$, and are positioned at uniform angular increment about a full circumference of the screw at each of 3–4 locations at which said flight is interrupted, said locations being widely spaced increments from each other and from upstream and downstream ends of said metering zone.

12. Method according to claim 11, wherein said plastic material is rigid polyvinyl chloride or polyethylene.

13. Extruder screw according to claim 7, wherein said plastic material is rigid polyvinyl chloride or polyethylene.

14. Method according to claim 10, wherein said plastic material is rigid polyvinyl chloride or polyethylene.